(12) United States Patent
Hallak (10) Patent No.: US 8,681,522 B2
(45) Date of Patent: Mar. 25, 2014

(54) METHOD FOR OPERATING AN ELECTRONICALLY CONTROLLED INVERTER WITH SWITCHES THAT ALTERNATE BETWEEN BEING ELEMENTS OF A BOOST-BUCK CONVERTER AND AN INVERTING CUK CONVERTER

(75) Inventor: Jalal Hallak, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 278 days.

(21) Appl. No.: 12/678,172

(22) PCT Filed: Aug. 25, 2008

(86) PCT No.: PCT/EP2008/061066
§ 371 (c)(1),
(2), (4) Date: Mar. 15, 2010

(87) PCT Pub. No.: WO2009/040199
PCT Pub. Date: Apr. 2, 2009

(65) Prior Publication Data
US 2010/0202176 A1    Aug. 12, 2010

(30) Foreign Application Priority Data

Sep. 20, 2007  (AT) .................................. A 1473/2007

(51) Int. Cl.
*H02M 7/537*   (2006.01)
(52) U.S. Cl.
USPC .............................. 363/131; 363/95; 363/132
(58) Field of Classification Search
USPC ......... 323/222–225, 259, 266, 271, 282, 344;
363/131, 95, 97, 101
See application file for complete search history.

(56) References Cited

U.S. PATENT DOCUMENTS

| 5,642,267 | A | * | 6/1997 | Brkovic et al. | 363/16 |
| 5,969,484 | A | | 10/1999 | Cuk | |
| 2007/0047277 | A1 | * | 3/2007 | Konishi et al. | 363/131 |
| 2008/0055940 | A1 | * | 3/2008 | Lawson et al. | 363/16 |
| 2008/0088250 | A1 | * | 4/2008 | Moskowitz | 315/224 |
| 2008/0157733 | A1 | * | 7/2008 | Williams | 323/266 |
| 2008/0266921 | A1 | * | 10/2008 | Hallak | 363/131 |

FOREIGN PATENT DOCUMENTS

| CN | 1965469 A | 5/2007 |
| DE | 102005030599 A1 | 1/2007 |
| KR | 20070039030 A | 4/2007 |
| WO | WO 2005122371 A2 | 12/2005 |
| WO | WO 2006005562 A1 | 1/2006 |

OTHER PUBLICATIONS

Axelrod et al., "Hybrid Switched—Capacitor—Cuk/Zeta/Septic Converters in Step-UP Mode", 2005 IEEE, pp. 1310-1313, Holon Academic Institute of Technology, Holon Israel, 0-7803-8834-8/05/ $20.00.

(Continued)

*Primary Examiner* — Adolf Berhane
*Assistant Examiner* — Gustavo Rosario Benitez (57) ABSTRACT

A method for operating an electronically controlled inverter and an inverter are provided. The inverter includes semiconductor switches, inductors and a first capacitor. The semiconductor switches of the inverter are controlled by a microcontroller alternately as elements of a buck converter and as elements of an inverting Cuk converter with a continuous connection of a neutral conductor at the output to a positive pole at the input side.

3 Claims, 6 Drawing Sheets

(56) References Cited

OTHER PUBLICATIONS

Penalver, Microprocessor Control of DC/AC Static Converters:, IEEE Transactions on Industrial electronics, Aug. 1985, pp. 186-191, vol. IE-32, No. 3.

0-7803-8834-8/05/$20.00 2005 IEEE. B.Axelrod, Y.Berkovich,Member, IEEE and A. Ioinovici, Fellow, IEEE. Hybrid Switched-Capacitor-Cuk/Zeta/Sepic Converters in Step-UP Mode; IEEE International Symposium on Circuits and Systems, Band 2, 23.-26. Mai 2005, Seiten 1310-1313. Kapitel 5.; Others.

C.M.Penalver, et. al."Microprocessor Control of DC/AC Static Converters"; IEEE Transactions on Industrial Electronics, vol. IE-32, No. 3, Aug. 1985, pp. 186-191, 0278-0046/85/0800-0186$01.00, 1985 IEEE; Others.

* cited by examiner

METHOD FOR OPERATING AN ELECTRONICALLY CONTROLLED INVERTER WITH SWITCHES THAT ALTERNATE BETWEEN BEING ELEMENTS OF A BOOST-BUCK CONVERTER AND AN INVERTING CUK CONVERTER

CROSS REFERENCE TO RELATED APPLICATIONS

This application is the US National Stage of International Application No. PCT/EP2008/061066 filed Aug. 25, 2008, and claims the benefit thereof. The International Application claims the benefits of Austrian Application No. A1473/2007 AT filed Sep. 20, 2007. All of the applications are incorporated by reference herein in their entirety.

FIELD OF INVENTION

The invention relates to a method for operating an electronically controlled inverter comprising semiconductor switches, inductors and a capacitor. In addition, the invention relates to an arrangement for executing the method.

BACKGROUND OF INVENTION

Electronically controlled inverters are known for example from the US publication: C. M. Penalver, et. al. "Microprocessor Control of DC/AC Static Converters"; IEEE Transactions on Industrial Electronics, Vol. IE-32, No. 3, August 1985, pp 186-191. They are used, for example, in solar systems to convert the direct current generated by the solar cells in such a way as to enable it to be fed into the public alternating voltage network. This is the only way to guarantee virtually unrestricted use of solar-produced energy.

The plurality of possible applications for inverters has resulted, inter alia, in the modification of the basic types of boost converters, boost-buck converters and buck converters for special applications. An example of this cited here is a publication in the journal EDN of 17 Oct. 2002 "Slave converters power auxiliary outputs", Sanjaya Maniktala; which describes different possible combinations of basic inverter types.

SUMMARY OF INVENTION

An object is to further develop the inverters known from the prior art.

The object is achieved with a method of the type described in the introduction, in which the inverter's semiconductor switches are controlled by means of a microcontroller alternately as elements of a boost-buck converter and as elements of an inverting Cuk converter having a continuous connection of a neutral conductor at the output to a positive pole at the input side.

The combination of the functions of a boost-buck converter and a Cuk converter according to the invention results in a particularly low-loss inverter, which consequently also has a high degree of efficiency and is therefore particularly suitable for use in solar systems. Hereby, the through-switching of the positive pole to the neutral connector of an alternating voltage network ensures that a current source can be connected on the input side, said current source having a negative potential with respect to ground. This is, for example, the case with photovoltaic generators with back-contact cells (e.g. monocrystalline silicon cells).

In an advantageous version of the method, the inverter's semiconductor switches are controlled by means of a microcontroller in such a way that a direct voltage applied to the input side during a negative half-wave of an alternating voltage applied to the output side is converted by means of a boost-buck converter and that the direct voltage applied to the input side during a positive half-wave of the alternating voltage applied to the output side is converted by means of a Cuk converter. This provides a low-loss method for feeding current from a direct current source into an alternating voltage network.

To execute the method according to the invention, an inverter is provided comprising a microcontroller, which is suitably programmed to control the semiconductor switches. Hereby, advantageously, this is a common microcontroller suitable for forming pulse-width modulated signals in dependence on a controller output signal.

Hereby it is of advantage for the inverter to comprise a first inductor, the first side of which is connected to the negative pole of an direct voltage and the second side of which is connected via a first semiconductor switch to the positive pole of the direct voltage, for the second side of the first inductor to be connected via the series circuit of a second semiconductor switch and a third semiconductor switch to the first terminal of a second inductor, the second terminal of which is connected to a conductor of the alternating voltage, for the connection of the second and third semiconductor switches to be connected via the first capacitor and a fifth semiconductor switch to the neutral conductor of the alternating voltage and for the connection of the first capacitor and fifth semiconductor switch to be connected via a fourth semiconductor switch to the first terminal of the second inductor. This circuit arrangement can be achieved with few circuit elements thus keeping the losses low hence achieving higher circuit efficiency.

An advantageous method for operating the advantageous inverter envisages that, during the negative half-wave of the alternating voltage, the first, second, third and fourth semiconductor switches are pulsed and the fifth semiconductor switch is permanently switched-on by means of a microcontroller and that hereby the first and second semiconductor switches and third and fourth semiconductor switches are in push-pull mode in each case and that, during the positive half-wave of the alternating voltage, the first and fifth semiconductor switches are pulse-switched in push-pull mode and that, during this period, the second and the fourth semiconductor switches are permanently switched-on and the third semiconductor switch is permanently switched-off.

BRIEF DESCRIPTION OF THE DRAWINGS

The invention will now be described in more detail below in an exemplary way with reference to the attached figures. These show schematically.

DETAILED DESCRIPTION OF INVENTION

Figure 1:
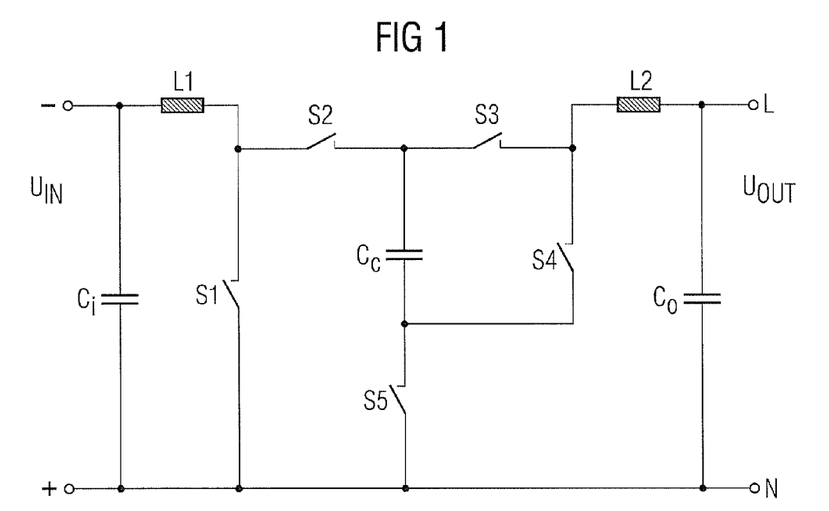
FIG. 1 circuit diagram of the inverter with boost-buck converter and Cuk converter when using general semiconductor switches FIG. 2 circuit diagram of the inverter with boost-buck converter and Cuk converter when using n-channel barrier layer MOSFETs FIG. 3 current flow during a switched-on phase of the Cuk converter FIG. 4 current flow during a switched-off of the Cuk converter FIG. 5-8 current flows during operation of the boost-buck converter with a negative half-wave of the alternating voltage FIG. 9 inverter signal patterns inverter with boost-buck converter and Cuk converter operation FIG. 10 alternative signal patterns of the inverter with boost-buck converter and Cuk converter operation

A simple exemplary switching arrangement of an inverter with boost-buck converter and Cuk converter using few components is shown in FIG. 1. At the input side, a direct voltage $U_{IN}$ is applied to an input capacitor Ci. The negative pole of this direct voltage $U_{IN}$ is connected to the first side of a first inductor L1. The second side of the first inductor L1 is connected via a first semiconductor switch S1 to the positive pole of the direct voltage $U_{IN}$.

The second side of the first inductor L1 is also connected via the series circuit of a second and a third semiconductor switch S2, S3 to the first terminal of a second inductor L2, the second terminal of which is connected to the conductor L of an alternating voltage $U_{OUT}$ on the output side. The connection of the second and third semiconductor switches S2, S3 is connected via a first capacitor Cc and a fifth semiconductor switch S5 to the neutral connector N of the alternating voltage $U_{OUT}$. In addition, a direct connection is provided between the positive pole of the direct voltage $U_{IN}$ and the neutral connector N of the alternating voltage $U_{OUT}$. An interconnection point between the first capacitor Cc and fifth semiconductor switch is connected via a fourth semiconductor switch S4 to the first terminal of the second inductor L2. An output capacitor Co is optionally connected between the conductor L and neutral connector N of the alternating voltage $U_{OUT}$ as an output filter.

Alternatively to this arrangement, the method according to the invention can also be executed with other switching arrangements, for example with a parallel circuit of a boost-buck converter and a Cuk converter.

Figure 2:
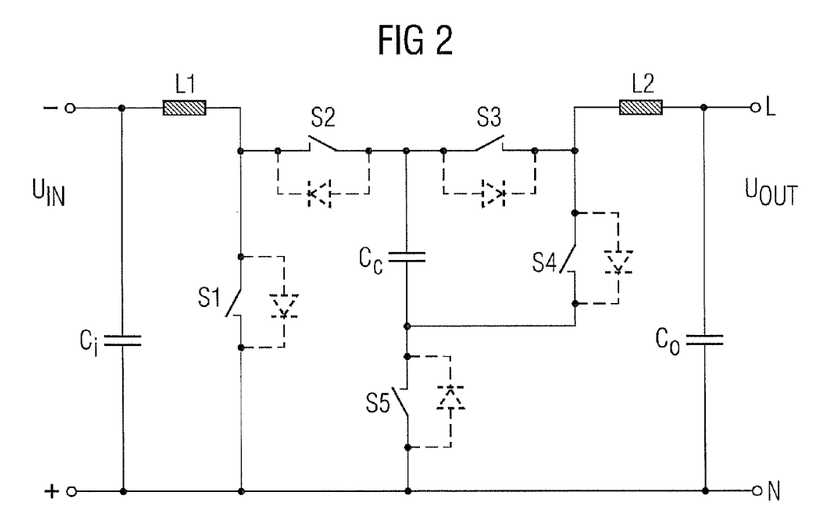

If, as shown in FIG. 2, semiconductor switches S1, S2, S3, S4, S5 with inverse diodes are used (n-channel barrier layer MOSFETs or IGBTs), the flow directions of these diodes should be noted. Hereby, the flow direction of the inverse diode of the first semiconductor switch S1 is specified as running from the negative pole to the positive pole of the direct voltage $U_{IN}$. The flow directions of the inverse diodes of the second and third semiconductor switches S2, S3 are switched from the first capacitor Cc to the inductors L1, L2. The inverse diode of the fourth semiconductor switch S4 is switched from the second inductor L2 to the first capacitor Cc in the conducting direction. The conducting direction of the inverse diode of the fifth semiconductor switch S5 is finally specified as running from the connection line between the positive pole of the direct voltage $U_{IN}$ and the neutral connector of the alternating voltage $U_{OUT}$ to the first capacitor Cc.

An arrangement of this kind prevents undesirable current flows through the inverse diodes in the individual switching phases of the inverter.

FIGS. 3 to 8 show switching arrangements with general semiconductor switches S1, S2, S3, S4, S5. The switching states hereby also apply to semiconductor switches S1, S2, S3, S4, S5 with inverse diodes.

Figure 3:
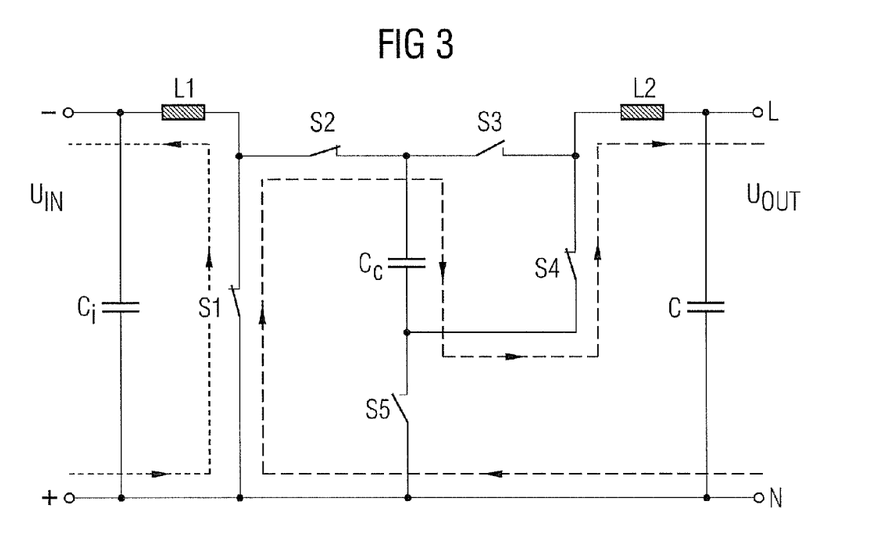
Figure 4:
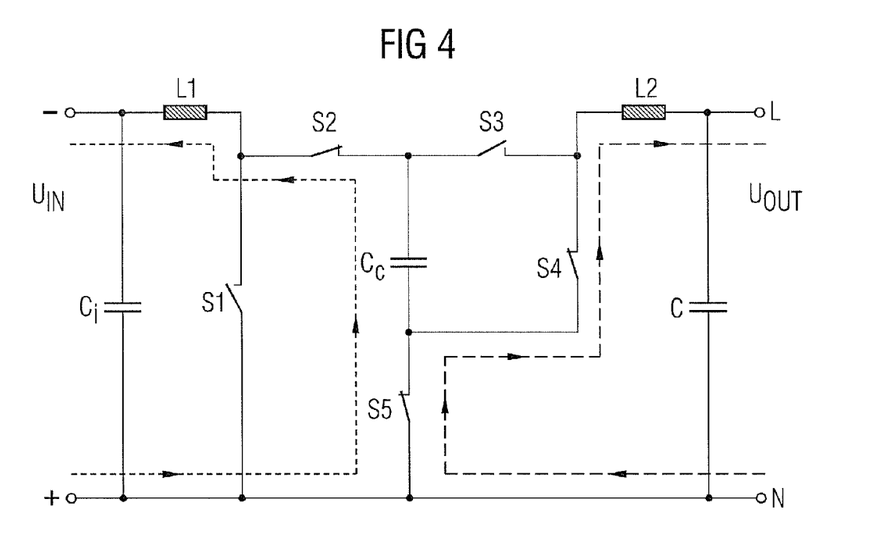
Figure 9:
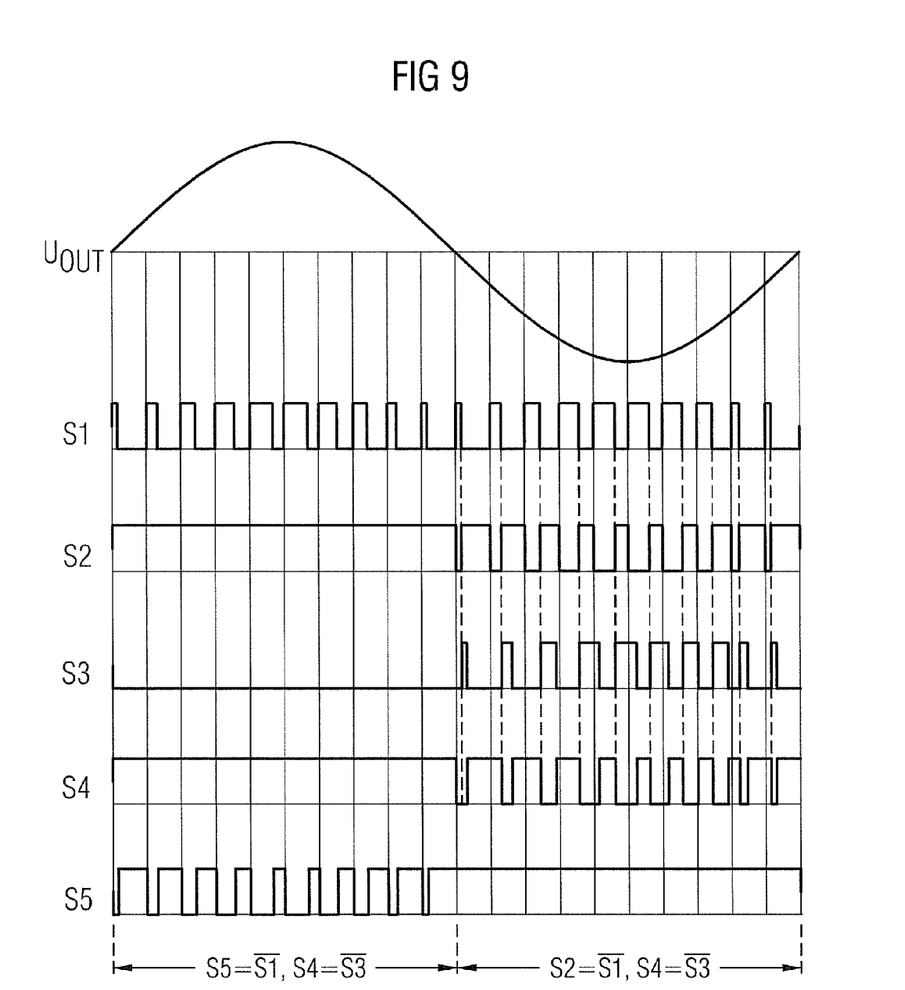
Figure 10:
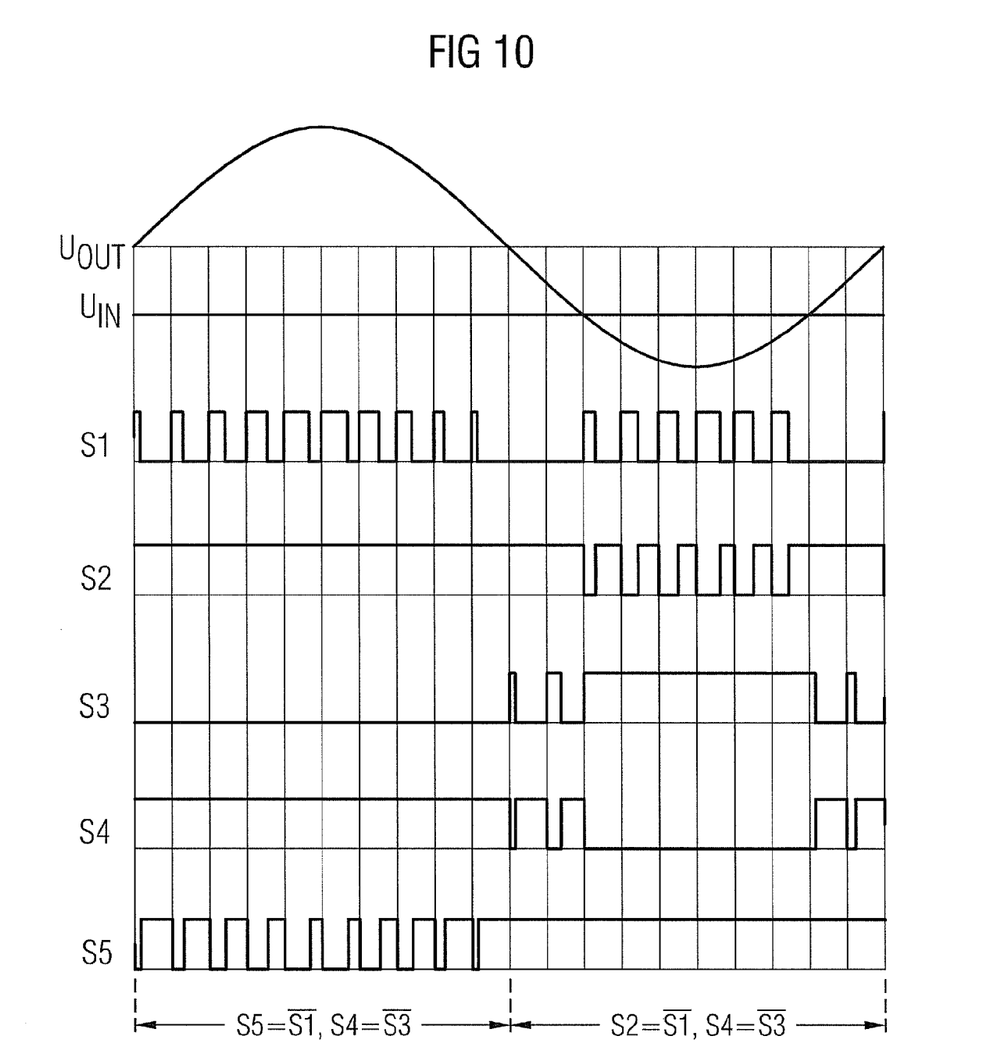

FIGS. 3 and 4 show the switching states of the semiconductor switches S1, S2, S3, S4, S5 during a positive half-wave of the alternating voltage $U_{OUT}$. The conversion of the direct voltage $U_{IN}$ into an alternating voltage $U_{OUT}$ is hereby performed by means of a Cuk converter. The second and fourth semiconductor switches S2, S4 are permanently switched-on and the third semiconductor switch S3 is permanently switched-off, as is also shown in FIGS. 9 and 10. The first and the fifth semiconductor switch S1, S5 are pulse-switched in push-pull mode. A starting operation of the Cuk converter is characterized by the switching-off of the fifth semiconductor switch S5 and the switching-on of the first semiconductor switch S1, as shown in FIG. 3. Current flows from the positive pole of the direct voltage $U_{IN}$ via the first switching element S1 and the first inductor L1 to the negative pole of the direct voltage $U_{IN}$. At the same time, current flows from the neutral connector N of the alternating voltage $U_{OUT}$ via the first semiconductor switch S1, the second semiconductor switch S2, the first capacitor Cc, the fourth semiconductor switch S4 and the second inductor L2 to the conductor L of the alternating voltage $U_{OUT}$.

A switched-off phase of the Cuk converter starts with the switching-on of the fifth semiconductor switch S5 and the switching-off of the first semiconductor switch S1, as shown in FIG. 4. In the input circuit, the current commutates from the first semiconductor switch S1 to the series circuit comprising the fifth semiconductor switch S5, the first capacitor Cc and the continuously closed second semiconductor switch S2. In the output circuit, the current goes from the neutral connector N of the alternating voltage $U_{OUT}$ via the fifth semiconductor switch S5, the fourth semiconductor switch S4 and the second inductor L2 to the conductor L of the alternating voltage $U_{OUT}$.

FIGS. 5 to 8 show the switching states during a negative half-wave of the alternating voltage $U_{OUT}$. Hereby, the voltage conversion is performed by means of a boost-buck converter. The first, second, third and fourth semiconductor switches S1, S2, S3, S4 are pulsed and the fifth semiconductor switch S5 remains permanently switched-on, wherein the first and second semiconductor switches S1, S2 and third and fourth semiconductor switches S3, S4 are switched in push-pull mode in each case.

Figure 5:
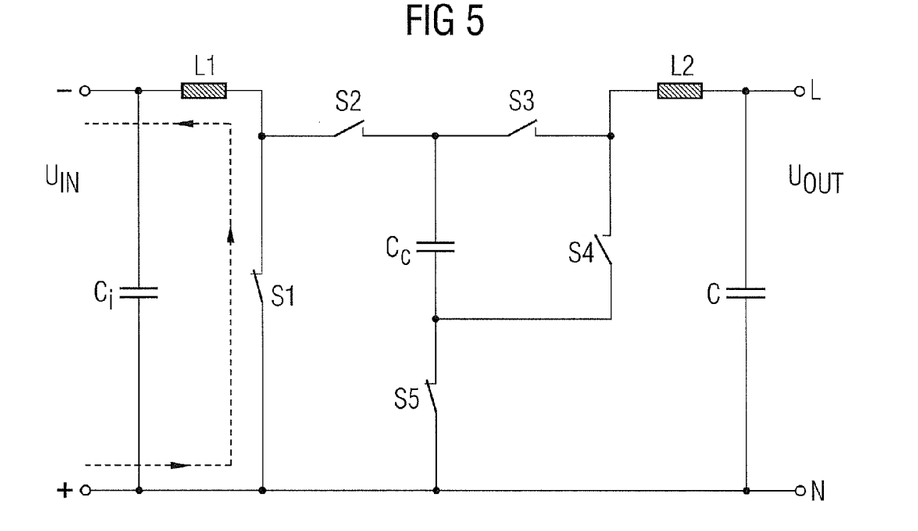

In the zero crossover from the positive to the negative half-wave, the first semiconductor switch S1 is switched-on and the second and the fourth semiconductor switch S2, S4 is switched-off, as shown in FIG. 5. In this switching status, the inverter accepts energy from a direct voltage source on the input side. To this end, a current path is established between the positive pole of the direct voltage $U_{IN}$ via the first semiconductor switch S1 and the first inductor L1 and the negative pole of the direct voltage $U_{IN}$.

Figure 6:
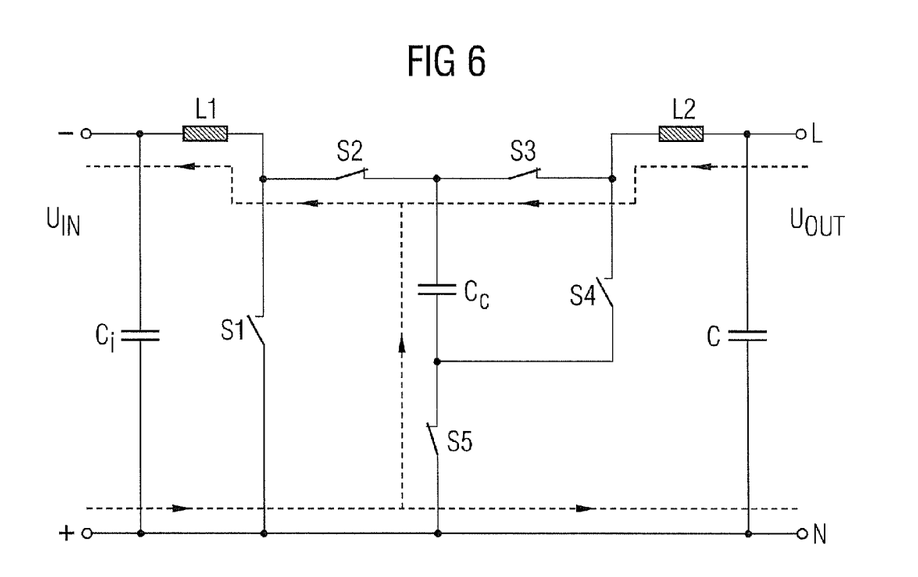

Hereby, the first inductor L1 stores energy, which, as shown in FIG. 6, in the next step, after the opening of the first semiconductor switch S1 with the second and third semiconductor switches S2, S3 now closed, is output via the second inductor L2 to an alternating voltage network on the output side or a load.

The electric circuit produced thereby runs from the positive pole of the direct voltage $U_{IN}$ via the alternating voltage network or the load, the second inductor L2, the third and second semiconductor switches S3, S2 and the first inductor L1 to the negative pole of the direct voltage $U_{IN}$. Hereby, the second inductor L2 stores energy. At the same time, the first capacitor Cc is charged due to the fact that the fifth semiconductor switch S5 is also closed.

Figure 7:
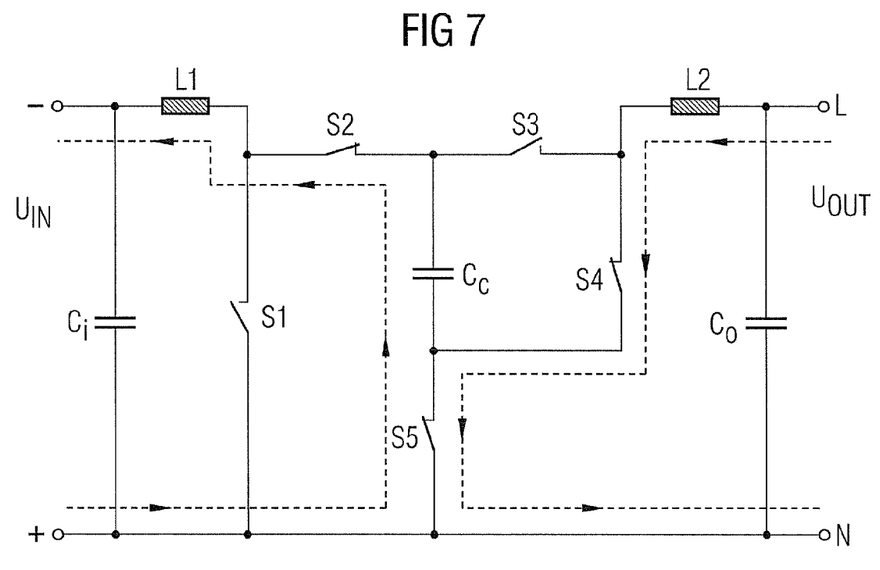

In the next switching operation, as shown in FIG. 7, the third semiconductor switch S3 is open and the fourth semiconductor switch S4 is closed. An electric circuit is formed via the second inductor L2, the fourth and fifth semiconductor switches S4, S5 and the alternating voltage network, wherein the second inductor L2 outputs the stored energy to the alternating voltage network.

At the same time, a further electric circuit runs from the positive pole of the direct voltage $U_{IN}$ via the fifth and second switching elements S5, S2, the first capacitor Cc and the first inductor L1 to the negative pole of the direct voltage $U_{IN}$.

Figure 8:
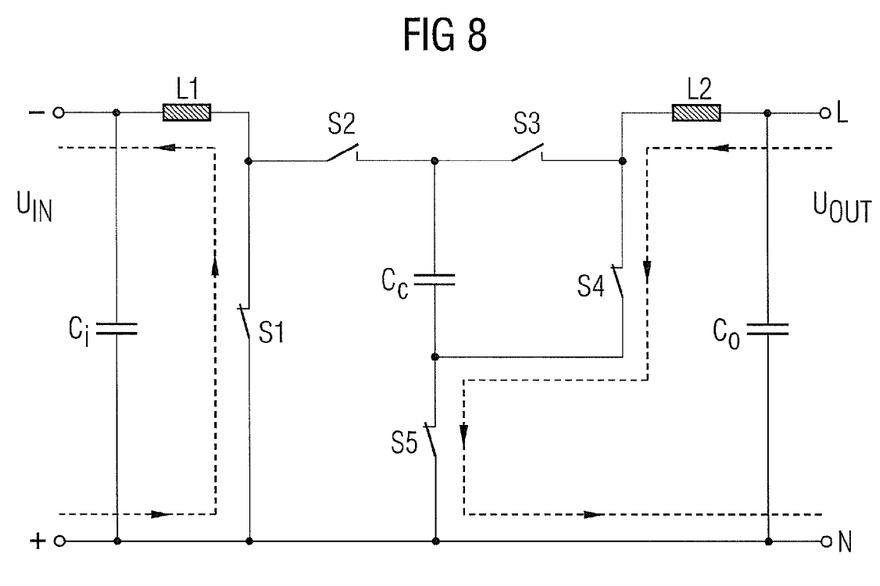

With switching status shown in FIG. 8, a switching cycle is concluded during the negative half-wave. The first semiconductor switch S1 is closed and thereby a current path is established between the positive pole of the direct voltage $U_{IN}$ via the first semiconductor switch. S1 and the first inductor L1 to the negative pole of the direct voltage $U_{IN}$. The inverter accepts electrical energy from the direct voltage source.

At the same time, the second inductor L2 outputs energy to the alternating voltage network, since the corresponding electric circuit is still closed via the fourth and the fifth semiconductor switches S4, S5. The electric circuit is only interrupted again on the opening of the fourth semiconductor switch S4.

FIGS. 9 and 10 each show the exemplary course of the control signals for the semiconductor switches S1, S2, S3, S4 and S5, wherein the two diagrams show conceivable different switching variants during the period of the negative half-wave of the alternating voltage $U_{OUT}$.

With the switching variant shown in FIG. 9, during a negative half-wave, the simultaneous operation of a boost converter and a buck converter take place. The first semiconductor switch S1 with the function of a boost converter element and the third semiconductor switch S3 with the function of a buck converter element are continuously pulse-switched. Hereby, the second semiconductor switch S2 functions as a synchronous rectifier, which is switched synchronously in push-pull mode with the first semiconductor switch S1.

Alternatively to this, FIG. 10 shows a switching variant in which, during the negative half-wave, the inverter works as either a buck converter or as a boost converter.

During the time intervals in which the alternating voltage $U_{OUT}$ is lower than the direct voltage $U_{IN}$, the third semiconductor switch S3 and, in push-pull mode also the fourth semiconductor switch S4, is pulse-switched. During this, the first semiconductor switch S1 remains continuously switched-off and the second semiconductor switch S2 remains continuously switched-on.

In the time interval in which the alternating voltage $U_{OUT}$ is higher than the alternating voltage $U_{IN}$, the first semiconductor switch S1 and, in push-pull mode also the second semiconductor switch S2, is pulse-switched. Hereby, the third semiconductor switch S3 remains continuously switched-on and the fourth semiconductor switch S4 remains continuously switched-off.

The invention claimed is:

1. A method for operating an electronically controlled inverter, comprising:
providing first, second, third, fourth and fifth semiconductor switches, first and second inductors and a first capacitor; and controlling the semiconductor switches of the inverter by a microcontroller to alternate between providing boost-buck converting and Cuk converting, wherein the semiconductor switches include a continuous connection of a neutral conductor at an alternating voltage network to a positive pole at an input side of a current source having a negative potential with respect to ground,
wherein a first side of the first inductor is connected to a negative pole of a direct voltage and a second side of the first inductor is connected via the first semiconductor switch to a positive pole of the direct voltage, wherein the second side of the first inductor is connected via a series circuit of the second semiconductor switch, wherein the third semiconductor switch is connected to a first terminal of the second inductor, a second terminal of the second inductor is connected to the conductor of the alternating voltage,
wherein the connection of the second and third semiconductor switches is connected via a first capacitor and the fifth semiconductor switch to a neutral connector of the alternating voltage, and wherein the connection of the first capacitor and fifth semiconductor switch is connected via a fourth semiconductor switch to the first terminal of the second inductor, wherein the semiconductor switches are controlled by the microcontroller so that a direct voltage applied to the input side is converted by way of the boost-buck converting during a negative half-wave of an alternating voltage at an output side of the inverter, and wherein the direct voltage applied to the input side is converted by way of the Cuk converting during a positive half-wave of the alternating voltage at the output side of the inverter.

2. An inverter, comprising: a microcontroller programmed to control first, second, third, fourth and fifth semiconductor switches of the inverter to alternate between boost-buck conversion and Cuk conversion, providing first and second inductors and a first capacitor; and wherein the semiconductor switches include a continuous connection of a neutral conductor at an alternating voltage network to a positive pole at an input side of a current source having a negative potential with respect to ground, wherein a first side of the first inductor is connected to a negative pole of a direct voltage and a second side of the first inductor is connected via the first semiconductor switch to a positive pole of the direct voltage, wherein the second side of the first inductor is connected via a series circuit of the second semiconductor switch, wherein the third semiconductor switch is connected to a first terminal of the second inductor, a second terminal of the second inductor is connected to the conductor of the alternating voltage, wherein the connection of the second and third semiconductor switches is connected via a first capacitor and the fifth semiconductor switch to a neutral connector of the alternating voltage, and wherein the connection of the first capacitor and fifth semiconductor switch is connected via a fourth semiconductor switch to the first terminal of the second inductor, wherein the microcontroller is configured to control the semiconductor switches so that a direct voltage applied to the input side is converted by way of the boost-buck conversion during a negative half-wave of an alternating voltage at an output side of the inverter, and wherein the direct voltage applied to the input side is converted by way of the Cuk conversion during a positive half-wave of the alternating voltage at the output side of the inverter.

3. The inverter as claimed in claim 2,
wherein, during a negative half-wave of the alternating voltage, the first, second, third and fourth semiconductor switches are pulsed and the fifth semiconductor switch is permanently switched-on by the microcontroller,
wherein the first and second semiconductor switches and the third and fourth semiconductor switches are each pulse-switched in push-pull mode, and
wherein, during a positive half-wave of the alternating voltage, the first and fifth semiconductor switches are pulse-switched in push-pull mode and that in this period, the second and fourth semiconductor switches are permanently switched-on and the third semiconductor switch is permanently switched-off.

* * * * *